United States Patent
Wang

(10) Patent No.: US 11,949,598 B2
(45) Date of Patent: Apr. 2, 2024

(54) WINDOW ADJUSTMENT METHOD AND APPARATUS, NETWORK DEVICE, TERMINAL DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 345 days.

(21) Appl. No.: 17/551,140

(22) Filed: Dec. 14, 2021

(65) Prior Publication Data

US 2022/0109636 A1    Apr. 7, 2022

Related U.S. Application Data

(63) Continuation of application No. PCT/CN2019/107350, filed on Sep. 23, 2019.

(51) Int. Cl.
*H04L 47/27*    (2022.01)
*H04L 5/00*    (2006.01)
(Continued)

(52) U.S. Cl.
CPC ............ *H04L 47/27* (2013.01); *H04L 5/0055* (2013.01); *H04W 4/06* (2013.01); *H04W 28/12* (2013.01); *H04W 80/02* (2013.01)

(58) Field of Classification Search
CPC ......... H04L 47/27; H04L 5/0055; H04L 1/18; H04W 4/06; H04W 28/12; H04W 80/02
See application file for complete search history.

(56) References Cited

U.S. PATENT DOCUMENTS

| | | | |
|---|---|---|---|
| 2006/0164994 A1* | 7/2006 | Beckmann | H04W 8/04 370/465 |
| 2009/0003378 A1* | 1/2009 | Sachs | H04L 1/188 370/466 |

(Continued)

FOREIGN PATENT DOCUMENTS

| | | |
|---|---|---|
| CN | 103001751 | 3/2013 |
| CN | 104283656 | 1/2015 |
| CN | 108631954 | 10/2018 |

OTHER PUBLICATIONS

"International Search Report (Form PCT/ISA/210) of PCT/CN2019/107350", dated Jun. 28, 2020, with English translation thereof, pp. 1-7.

(Continued)

*Primary Examiner* — Afshawn M Towfighi
(74) *Attorney, Agent, or Firm* — JCIP GLOBAL INC.

(57) ABSTRACT

A window adjustment method and apparatus, a network device and a terminal device, the method comprising: a network device determining a first sending parameter, the first sending parameter being used to indicate an SN of a first data packet, and sending the first data packet according to the first sending parameter, the first data packet being a next data packet expected to be sent in a send window (501); if the network device confirms that the first data packet has been accurately received by at least one terminal device, the network device moving the send window; a starting SN of the send window before being moved being a first SN, a starting SN of the send window after being moved being a second SN, and the second SN being a first unconfirmed SN after the first SN (502).

20 Claims, 12 Drawing Sheets

(51) Int. Cl.
  *H04W 4/06* (2009.01)
  *H04W 28/12* (2009.01)
  *H04W 80/02* (2009.01)

(56) References Cited

U.S. PATENT DOCUMENTS

2015/0065040 A1* 3/2015 Zhou ..................... H04B 5/72
                                                      455/41.1
2016/0366008 A1* 12/2016 Zeng .................... H04L 1/1825
2019/0327033 A1* 10/2019 Huang .................. H04L 1/1835
2020/0403827 A1* 12/2020 Zhang .................. H04L 12/6418

OTHER PUBLICATIONS

"Written Opinion of the International Searching Authority (Form PCT/ISA/237) of PCT/CN2019/107350," dated Jun. 28, 2020, with English translation thereof, pp. 1-8.

* cited by examiner a terminal device moves a receiving window based on an SN of a received first data packet or first indication information, the first indication information is used to indicate a third SN, and a data packet corresponding to an SN before the third SN is not repeatedly transmitted /701

FIG. 7

WINDOW ADJUSTMENT METHOD AND APPARATUS, NETWORK DEVICE, TERMINAL DEVICE

CROSS-REFERENCE TO RELATED APPLICATION

This application is a continuation of international PCT application serial no. PCT/CN2019/107350, filed on Sep. 23, 2019. The entirety of the above-mentioned patent application is hereby incorporated by reference herein and made a part of this specification.

BACKGROUND

Technical Field

The embodiments of the disclosure relate to the technical field of mobile communication, and in particular, relates to a window adjustment method and apparatus, a network device, and a terminal device.

Description of Related Art

In the new radio (NR) system, the radio link control (RLC) entity supports the acknowledgement mode (AM), and the RLC AM mode has an automatic repeat-reQuest (ARQ) feedback mechanism. The receiving end sends an RLC status report to feed back whether the receiving status of the RLC packet is positive acknowledgement (ACK) or negative acknowledgement (NACK). The sending end may repeatedly send the RLC packet with NACK feedback.

In NR, the RLC feedback mechanism is only used in the unicast scenario in the connected state and is only used in the RLC AM mode. The multicast scenario in NR does not introduce a feedback mechanism, that is, the terminal device does not need to receive feedback when receiving the multimedia broadcast multicast service (MBMS) service, and the transmission reliability of the MBMS service cannot be guaranteed.

SUMMARY

The embodiments of the disclosure provide a window adjustment method and apparatus, a network device, and a terminal device.

An embodiment of the disclosure provides a window adjustment method, and the method includes the following steps.

A network device determines a first sending parameter used to indicate a secondary node (SN) of a first data packet and sends the first data packet according to the first sending parameter. The first data packet is a next data packet expected to be sent in a send window.

If the network device confirms that the first data packet is accurately received by at least one terminal device, the network device moves the send window.

A starting SN of the send window before being moved is a first SN, a starting SN of the send window after being moved is a second SN, and the second SN is a first unconfirmed SN after the first SN.

An embodiment of the disclosure further provides a window adjustment method, and the method includes the following steps.

A terminal device moves a receiving window based on an SN of a received first data packet or first indication information. The first indication information is used to indicate a third SN, and a data packet corresponding to an SN before the third SN is not repeatedly transmitted.

An embodiment of the disclosure further provides a window adjustment apparatus including a determination unit and an adjustment unit.

The determination unit is used for determining a first sending parameter used to indicate an SN of a first data packet and sending the first data packet according to the first sending parameter. The first data packet is a next data packet expected to be sent in a send window.

The adjustment unit is used for moving the send window if the adjustment unit confirms that the first data packet is accurately received by at least one terminal device. A starting SN of the send window before being moved is a first SN, a starting SN of the send window after being moved is a second SN, and the second SN is a first unconfirmed SN after the first SN.

An embodiment of the disclosure further provides a window adjustment apparatus including an adjustment unit.

The adjustment unit is used for moving a receiving window based on an SN of a received first data packet or first indication information. The first indication information is used to indicate a third SN, and a data packet corresponding to an SN before the third SN is not repeatedly transmitted.

An embodiment of the disclosure further provides a network device including a processor and a memory. The memory is used for storing a computer program, and the processor is used for calling and running the computer program stored in the memory to execute the window adjustment method.

An embodiment of the disclosure further provides a terminal device including a processor and a memory. The memory is used for storing a computer program, and the processor is used for calling and running the computer program stored in the memory to execute the window adjustment method.

An embodiment of the disclosure further provides a chip configured for implementing the window adjustment method.

To be specific, the chip includes a processor configured to call and run a computer program from a memory, such that a device installed with the chip executes the window adjustment method.

An embodiment of the disclosure further provides a computer-readable storage medium configured for storing a computer program, and the computer program enables a computer to execute the window adjustment method.

An embodiment of the disclosure further provides a computer program product including a computer program instruction, and the computer program instruction enables a computer to execute the window adjustment method.

An embodiment of the disclosure further provides a computer program, and when running on a computer, the computer program enables the computer to execute the window adjustment method.

Through the above technical solution, the NR system supports the broadcast and multicast of MBMS service. Moreover, a mobile mechanism (or updating mechanism) for the send window and receiving window of MBMS service is provided, and RLC feedback or PDCP feedback is implemented through the send window and the receiving window. Further, the data packet is retransmitted based on the RLC feedback or the PDCP feedback, and the reliability of service data transmission is thereby ensured.

BRIEF DESCRIPTION OF THE DRAWINGS

The drawings described herein are used to provide a further understanding of the disclosure, and constitute a part of the disclosure. The exemplary embodiments of the disclosure and the description thereof are used to explain the disclosure, and do not constitute an improper limitation of the disclosure. In the drawings:

FIG. 7 is a second schematic flow chart of a window adjustment method provided by an embodiment of the disclosure.

DESCRIPTION OF THE EMBODIMENTS

The technical solution in the embodiments of the disclosure will be described below in combination with the drawings in the embodiments of the disclosure. Obviously, the described embodiments are part of the embodiments of the disclosure, rather than all of the embodiments. Based on the embodiments in the disclosure, all other embodiments obtained by a person having ordinary skill in the art without creative effort shall fall within the protection scope of the disclosure.

The technical solutions of the embodiments of the disclosure may be applied to various communication systems, such as the long term evolution (LTE) system, LTE frequency division duplex (FDD) system, LTE time division duplex system, 5G communication system, or future communication systems.

Figure 1:
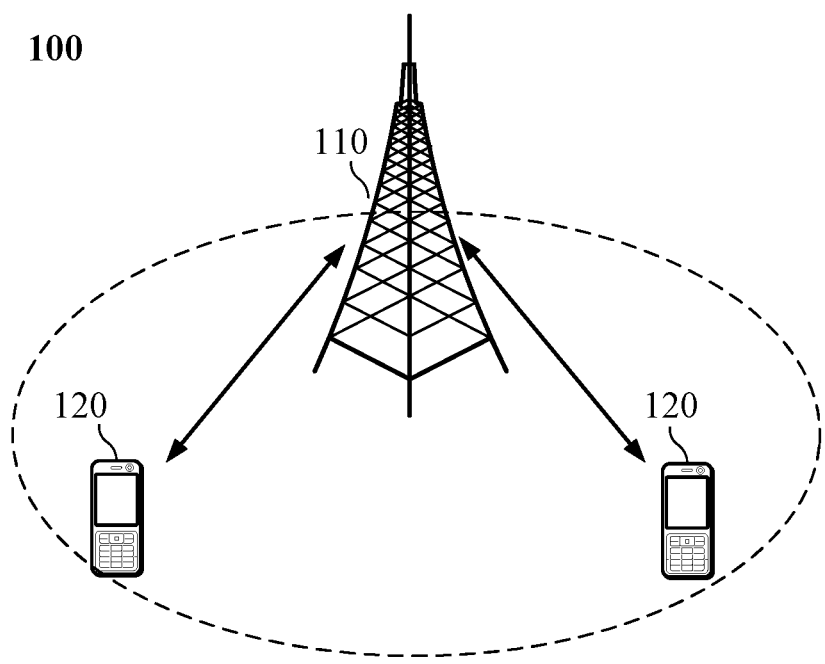
FIG. 1 is a schematic view of a communication system architecture provided an embodiment of the disclosure.

Exemplarily, a communication system 100 applied in the embodiments of the disclosure is shown in FIG. 1. The communication system 100 may include a network device 110, and the network device 110 may be a device communicating with terminals 120 (or referred to as communication terminals or terminals). The network device 110 may provide communication coverage for a specific geographic area and may communicate with terminals located within the coverage area. Optionally, the network device 110 may be an evolutional base station (evolutional Node B, eNB, or eNodeB) in the LTE system, or a wireless controller in a cloud radio access network (CRAN), or the network device may be a mobile switching center, a relay station, an access point, a vehicle-mounted device, a wearable device, a hub, a switch, a bridge, a router, a network side device in the 5G network, or a network device in the future communication system.

The communication system 100 also includes at least one terminal 120 located within the coverage area of the network device 110. The "terminal" used herein includes but not limited to connection via a wired line (e.g., a public switched telephone network (PSTN), a digital subscriber line (DSL), a digital cable, or a direct cable), via another data connection/network, via a wireless interface (e.g., for a cellular network, a wireless local area network (WLAN), a digital television network such as a DVB-H network, a satellite network, or an AM-FM broadcast transmitter), via another terminal that is configured to receive/send a communication signal, and/or via an Internet of Things (IoT) device. A terminal that is configured to communicate through a wireless interface may be referred to as a "wireless communication terminal", a "wireless terminal", or a "mobile terminal". Examples of the mobile terminal include but not limited to a satellite or a cellular phone, a personal communication system (PCS) terminal that may combine a cellular radio phone with data processing, faxing, and data communication capabilities, a personal digital assistant (PDA) including a radio phone, a pager, Internet/Intranet accessing, a web browser, a notepad, a calendar, and/or a global positioning system (GPS) receiver, a conventional laptop and/or a handheld receiver, or other electronic devices including a radio telephone transceiver. The terminal may refer to an access terminal, user equipment (UE), a user unit, a user station, a mobile station, a mobile platform, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a PDA, a handheld device with wireless communication capabilities, a computing device or other processing devices connected to a wireless modem, a vehicle-mounted device, a wearable device, a terminal in the 5G network, or a terminal in a PLMN that may evolve in the future.

Optionally, device to device (D2D) communication may be performed between the terminals 120.

Optionally, the 5G communication system or the 5G network may also be referred to as a new radio (NR) system or a NR network.

FIG. 1 schematically illustrates one network device and two terminals, and optionally, the communication system 100 may include a plurality of network devices, and the coverage area of each network device may include other numbers of terminal devices, which is not limited in the embodiments of the disclosure.

Optionally, the communication system 100 may further include other network entities such as a network controller, a mobility management entity, etc., which are not limited in the embodiments of the disclosure.

It should be understood that a device with a communication function in the network/system in the embodiments of the disclosure may be referred to as a communication device. Taking the communication system 100 shown in FIG. 1 as an example, the communication device may include the network device 110 and the terminals 120 with communication functions. The network device 110 and the terminals 120 may be the specific devices described above, and description thereof is not repeated herein. The communication device may also include other devices in the communication system 100, such as other network entities such as a network controller, a mobility management entity, etc., which are not limited in the embodiments of the disclosure.

It should be understood that the terms "system" and "network" in the specification may be used interchangeably most of the time in the specification. The term "and/or" in the specification is merely an association relationship that describes the associated objects, indicating that there may be three types of relationships. For instance, A and/or B may mean that: A alone exists, A and B exist at the same time, and B exists alone. Besides, the character "/" in the specification generally indicates that the associated objects before and after are in an "or" relationship.

In order to facilitate the understanding of the technical solution of the embodiments of the disclosure, the technical solution related to the embodiments of the disclosure is described below.

With the pursuit of speed, latency, high-speed mobility, energy efficiency, and diversity and complexity of services in future life, the $3^{rd}$ Generation Partnership Project (3GPP) international standards organization began the development of 5G. The main application scenarios of 5G are: enhanced mobile broadband (eMBB), ultra-reliable low-latency communications (URLLC), and massive machine-type communications (mMTC).

On the one hand, eMBB still aims to provide users with multimedia content, services, and data, and its demand is growing rapidly. On the other hand, since eMBB may be deployed in different scenarios, such as indoors, urban areas, rural areas, etc., its capabilities and requirements are considerably different and may not be generalized, and detailed analysis is required to be made together with specific deployment scenarios. Typical applications of URLLC include: industrial automation, power automation, telemedicine operations (surgery), traffic safety protection, etc. Typical features of mMTC include: high connection density, small data volume, delay-insensitive services, and low costs and long service life of modules.

RRC State

In 5G, in order to reduce air interface signaling, quickly restore wireless connections, and quickly restore data services, a new radio resource control (RRC) state is defined, that is, the RRC inactive (RRC_INACTIVE) state. This state is different from the RRC idle (RRC_IDLE) state and the RRC active (RRC_ACTIVE) state. Herein, the following description is applied.

1) RRC_IDLE state (referred to as idle state): Mobility is UE-based cell selection and reselection, paging is initiated by the core network (CN), and the paging area is configured by the CN. UE context is not provided on the base station side, and an RRC connection is not provided.

2) RRC_CONNECTED state (referred to as connected state): An RRC connection is provided, and UE context is provided on the base station side and the UE side. The network side knows that the location of the UE is of a specific cell level. Mobility is the mobility controlled by the network side. Unicast data may be transmitted between the UE and the base station.

3) RRC_INACTIVE state (referred to as inactive state): Mobility is UE-based cell selection and reselection, a connection between CN-RAN is provided, UE context is stored on a specific base station, paging is triggered by the RAN, the RAN-based paging area is managed by the RAN, and the network side knows that the location of the UE is based on the paging area level of the RAN.

MBMS

Multimedia broadcast multicast service (MBMS) is introduced in 3GPP Release 6 (Release 6, R6). MBMS is a technology that transfers data from one data source to multiple UEs through network resource sharing, and this technology may effectively utilize network resources while providing multimedia services, and thus may realize higher-rate (e.g., 256 kbps) broadcasting and multicasting of multimedia services.

Due to the low spectrum efficiency of MBMS in 3GPP R6, it is not sufficient to effectively carry and support the operation of mobile TV-type services. Therefore, in LTE, it is clearly proposed in 3GPP to enhance the ability to support downlink high-speed MBMS services, and the design requirements for the physical layer and air interface are determined.

3GPP R9 introduces evolved MBMS (eMBMS) into LTE. eMBMS proposes the concept of single frequency network (SFN), namely multimedia broadcast multicast service single frequency network (MBSFN). MBSFN uses a uniform frequency to send service data in all cells at the same time, but synchronization between cells is required to be ensured. This method may greatly improve the overall signal-to-noise ratio distribution of the cell, and the spectrum efficiency may be significantly improved accordingly. eMBMS realizes the broadcast and multicast of services based on the IP multicast protocol.

In LTE or LTE-advanced (LTE-A), MBMS only has a broadcast bearer mode, not a multicast bearer mode. In addition, the reception of MBMS services is suitable for UEs in idle state or connected state.

The concept of single cell point to multipoint (SC-PTM) is introduced in 3GPP R13, and SC-PTM is based on the MBMS network architecture.

MBMS introduces new logical channels, including the single cell-multicast control channel (SC-MCCH) and the single cell-multicast transport channel (SC-MTCH). SC-MCCH and SC-MTCH are mapped to the downlink-shared channel (DL-SCH), and further, DL-SCH is mapped to the physical downlink shared channel (PDSCH). Herein, SC-MCCH and SC-MTCH belong to logical channels, DL-SCH belongs to transport channels, and PDSCH belongs to physical channels. SC-MCCH and SC-MTCH do not support the hybrid automatic repeat reQuest (HARQ) operation.

MBMS introduces a new system information block (SIB) type, namely SIB20. To be specific, the SC-MCCH configuration information is transmitted through SIB20, and there is only one SC-MCCH in a cell. The configuration information of the SC-MCCH includes: the modification period of the SC-MCCH, the repetition period of the SC-MCCH, and information such as radio frames and sub-frames for scheduling the SC-MCCH. Further, 1) The boundary of the SC-MCCH modification period satisfies SFN mod m=0, where SFN represents the system frame number of the boundary, and m is the modification period of the SC-MCCH configured in SIB20 (i.e., sc-mcch-ModificationPeriod). 2) The radio frame scheduling SC-MCCH satisfies: SFN mod mcch-RepetitionPeriod=mcch-Offset, where SFN represents the system frame number of the radio frame, mcch-RepetitionPeriod represents the repetition period of the SC-MCCH, and mcch-Offset represents the offset of the SC-MCCH. 3) The sub-frame for scheduling SC-MCCH is indicated by sc-mcch-Subframe.

SC-MCCH is scheduled through the physical downlink control channel (PDCCH). On the one hand, a new radio network temporary identity (RNTI), namely, single cell RNTI (SC-RNTI) is introduced to identify the PDCCH (e.g., SC-MCCH PDCCH) used to schedule the SC-MCCH. Optionally, the SC-RNTI has a fixed value of FFFC. On the other hand, a new RNTI is introduced, that is, a single cell notification RNTI (SC-N-RNTI) to identify the PDCCH (e.g., notification PDCCH) used to indicate the SC-MCCH change notification. Optionally, the SC-N-RNTI has a fixed value of FFFB; further, one of the 8 bits of the DCI 1C may be used to indicate the change notification. In LTE, the configuration information of the SC-PTM is based on the SC-MCCH configured by the SIB20, and then the SC-MCCH is configured with the SC-MTCH, and the SC-MTCH is used to transmit service data.

To be specific, the SC-MCCH only transmits one message (that is, SCPTMConfiguration), which is used to configure the configuration information of the SC-PTM. The configuration information of SC-PTM includes: temporary mobility group identity (TMGI), session identity (session id), group RNTI (G-RNTI), discontinuous reception (DRX) configuration information, and neighboring cell SC-PTM service information, etc. It should be noted that the SC-PTM in R13 does not support the robust header compression (ROHC) function.

The downlink discontinuous reception of SC-PTM is controlled by the following parameters: onDurationTimerSCPTM, drx-InactivityTimerSCPTM, SC-MTCH-SchedulingCycle, and SC-MTCH-SchedulingOffset.

When [(SFN*10)+subframe number]modulo (SC-MTCH-SchedulingCycle)=SC-MTCH-SchedulingOffset is satisfied, the timer onDurationTimerSCPTM is activated.

When the downlink PDCCH scheduling is received, the timer drx-InactivityTimerSCPTM is activated.

Only when the timer onDurationTimerSCPTM or drx-InactivityTimerSCPTM is running, the downlink SC-PTM service is received.

SC-PTM service continuity adopts the concept of MBMS service continuity based on SIB15, namely "SIB15+MBMSInterestIndication" mode. The service continuity of the UE in the idle state is based on the concept of frequency priority.

In NR, many scenarios need to support multicast and broadcast service requirements, such as the Internet of Vehicles, industrial Internet, and so on. Therefore, MBMS needs to be introduced in NR.

On the other hand, the radio link control (RLC) layer (that is, the RLC entity) has three modes: transparent mode (TM), un-acknowledged mode (UM), and acknowledged mode (AM). In NR, the RLC AM mode has an ARQ feedback mechanism. The receiving end sends an RLC status report to feed back whether the receiving status of the RLC packet is positive acknowledgement (ACK) or negative acknowledgement (NACK). The sending end may repeatedly send the RLC packet with NACK feedback.

In NR, the RLC feedback mechanism is only used in the unicast scenario in the connected state and is only used in the RLC AM mode. For the multicast scenario in NR, no feedback mechanism is introduced, that is, the terminal device does not need feedback when receiving the MBMS service. There is no remedy for MBMS service data loss, and the transmission reliability of MBMS service cannot be guaranteed. For some scenarios in NR, such as V2X, industrial network Internet, and other scenarios, the reliability requirements for multicast transmission grow. Therefore, the introduction of a feedback mechanism for MBMS to ensure the reliability of service transmission (that is, to ensure that all members in the multicast group receive the service data) needs to be considered and introduced. Therefore, the following technical solution of the embodiments of the disclosure is provided. In the technical solution of the embodiments of the disclosure, RLC feedback or PDCP feedback and repeated transmission mechanisms are introduced in multicast to ensure the reliability of the transmission of service data in the group.

Figure 2:
FIG. 2 is a schematic diagram of a first SIB related configuration provided by an embodiment of the disclosure.

In the technical solution of the embodiments of the disclosure, a new SIB (referred to as a first SIB) is defined. With reference to FIG. 2, the first SIB includes configuration information of a first MCCH. Herein, the first MCCH is a control channel of a MBMS service, and in other words, the first SIB is used to configure the configuration information of the control channel of the NR MBMS. Optionally, the control channel of the NR MBMS may also be referred to as the NR MCCH (that is, the first MCCH).

Further, the first MCCH is used to carry the first signaling, and the name of the first signaling (e.g., signaling A) is not particularly defined in the embodiments of the disclosure. The first signaling includes configuration information of at least one first MTCH. Herein, the first MTCH is a service channel (also referred to as a data channel or a transport channel) of the MBMS service, and the first MTCH is used to transmit MBMS service data (e.g., NR MBMS service data). In other words, the first MCCH is used to configure the configuration information of the service channel of the NR MBMS. Optionally, the service channel of the NR MBMS may also be referred to as the NR MTCH (i.e., the first MTCH).

To be specific, the first signaling is used to configure the service channel of the NR MBMS, the service information corresponding to the service channel, and the scheduling information corresponding to the service channel. Further, optionally, the service channel corresponds to service information, such as TMGI, session id, and other identity information of the identity service. The service channel corresponds to scheduling information, such as the RNTI (e.g., G-RNTI, DRX configuration information, etc.) used when the MBMS service data corresponding to the service channel is scheduled.

Note that the transmission of the first MCCH and the transmission of the first MTCH are both scheduled based on the PDCCH. Herein, the RNTI used for scheduling the PDCCH of the first MCCH uses a unique identifier of the entire network, that is, a fixed value. The RNTI used by the PDCCH for scheduling the first MTCH is configured through the first MCCH.

Further, the first MCCH also carries at least one of the following: first indication information (used to indicate whether the MBMS service (corresponding to the TMGI and/or the session id) requires HARQ feedback), second indication information (used to indicate the number of members in the multicast group corresponding to the MBMS service), and third indication information (used to indicate whether the terminal device needs to enter the connected state to receive the MBMS service). Herein, when the terminal device registers with the MBMS service, the network device allocates a member index number to the terminal device registered with the MBMS service.

Figure 3:
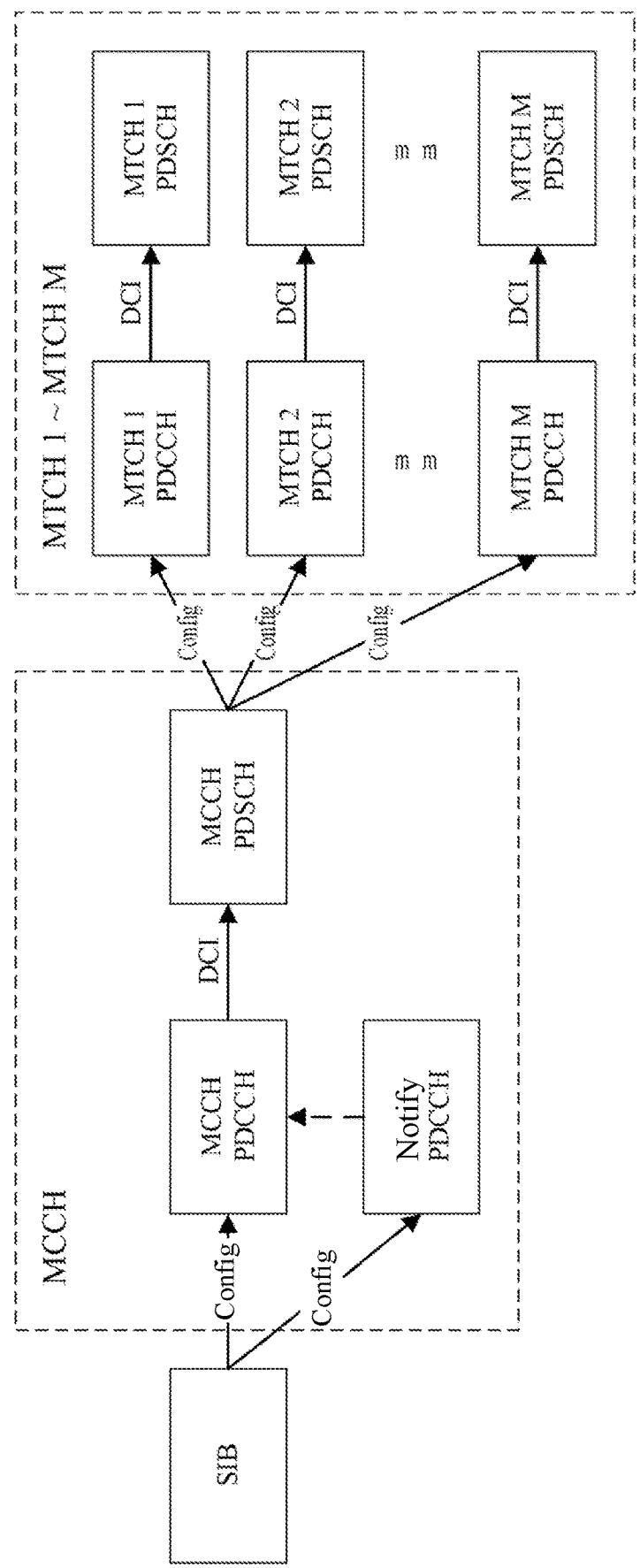
FIG. 3 is a schematic diagram of a PTM configuration transmission mechanism provided by an embodiment of the disclosure.
Figure 4:
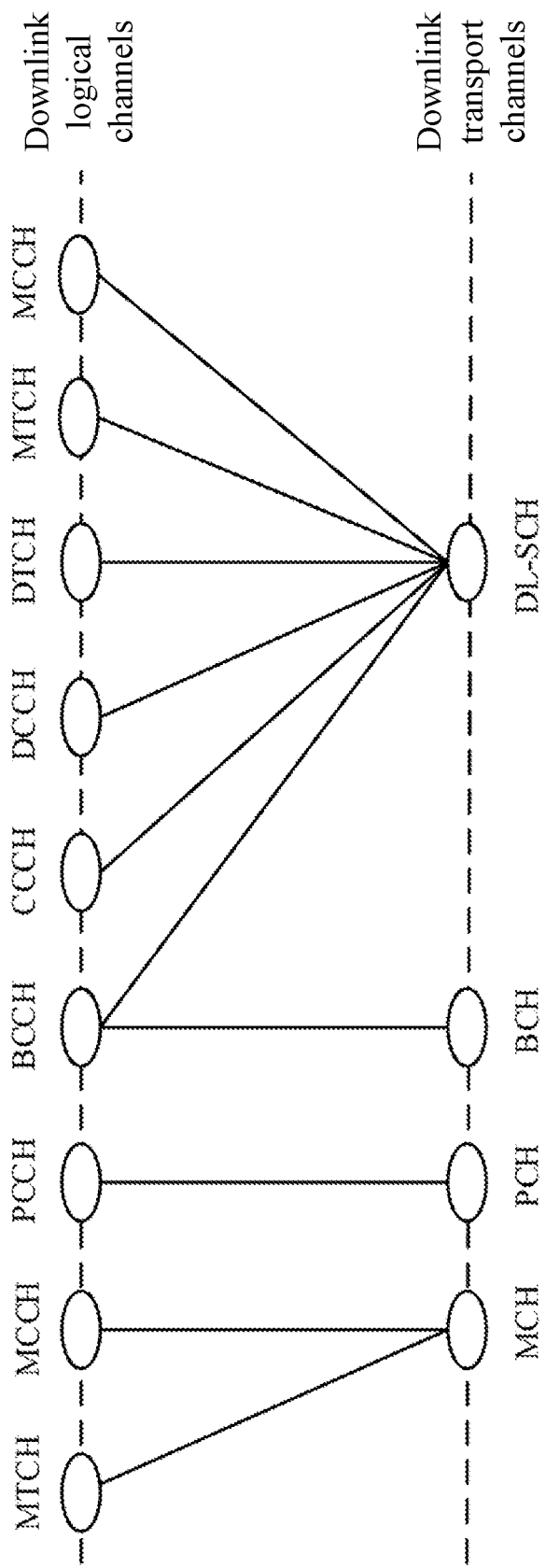
FIG. 4 is a PTM channel and a mapping diagram thereof provided by an embodiment of the disclosure.

It should be noted that in the embodiments of the disclosure, the naming of the first SIB, the first MCCH, and the first MTCH is not limited. For ease of description, the first SIB may also be abbreviated as SIB, the first MCCH may also be abbreviated as MCCH, and the first MTCH may also be abbreviated as MTCH. With reference to FIG. 3, the PDCCH (i.e., MCCH PDCCH) used to schedule the MCCH and the notification PDCCH are configured through the SIB, and herein, the DCI carried by the MCCH PDCCH is used to schedule the PDSCH (i.e., MCCH PDSCH) used to transmit the MCCH. Further, M PDCCHs (i.e., MTCH 1 PDCCH, MTCH 2 PDCCH, . . . , and MTCH M PDCCH) used for scheduling MTCH are configured through MCCH, where the DCI carried by MTCH n PDCCH is scheduled to transmit PDSCH for MTCH n, and n is an integer greater than or equal to 1 and less than or equal to M. With reference to FIG. 4, MCCH and MTCH are mapped to DL-SCH. Further, DL-SCH is mapped to PDSCH, where MCCH and MTCH belong to logical channels, DL-SCH belongs to transport channels, and PDSCH belongs to a physical channel.

Figure 5:
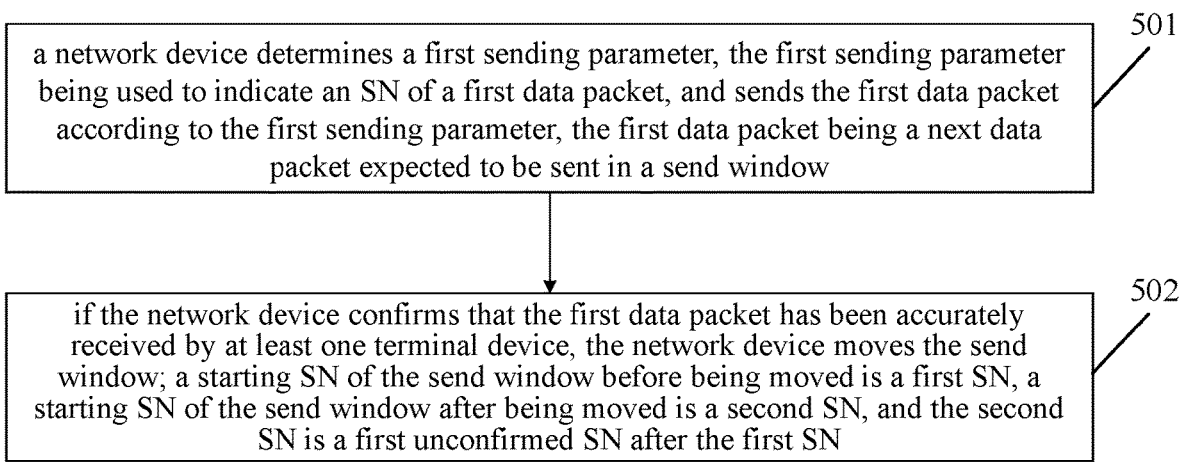
FIG. 5 is a first schematic flow chart of a window adjustment method provided by an embodiment of the disclosure.

FIG. 5 is a first schematic flow chart of a window adjustment method provided by an embodiment of the disclosure. As shown in FIG. 5, the window adjustment method includes the following steps.

Step 501: A network device determines a first sending parameter used to indicate an SN of a first data packet and sends the first data packet according to the first sending parameter, where the first data packet is a next data packet expected to be sent in a send window.

In an optional embodiment of the disclosure, the network device may be a base station, such as a gNB.

In the embodiments of the disclosure, the send window includes a plurality of SNs.

Further, with reference to FIG. 6, the send window includes the SNs in the following range: $TX\_Next\_Ack \leq SN < TX\_Next\_Ack + MBMS\_Window\_Size$.

Figure 6:
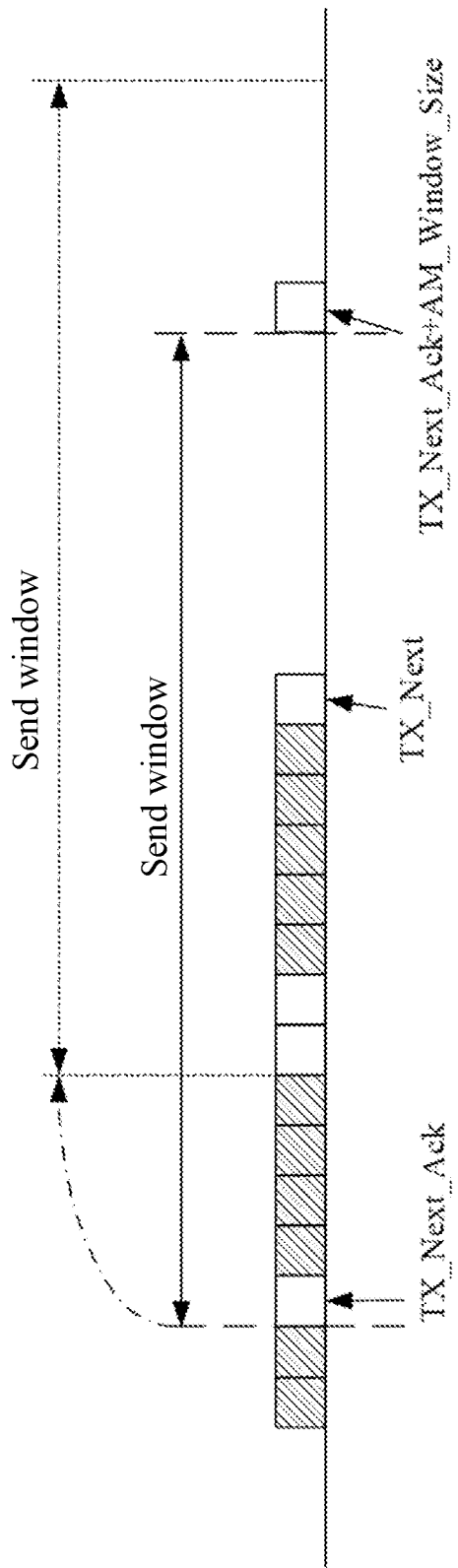
FIG. 6 is a schematic diagram of a send window provided by an embodiment of the disclosure.

The variables in FIG. 6 are described below.

1) MBMS_Window_Size: is used to indicate a window length of the send window, and optionally, the window length of the send window is configured by the first MCCH or agreed through a protocol.

2) TX_Next_Ack: is used to indicate the first or smallest unconfirmed SN in the send window.

It should be noted that the unconfirmed SN in the embodiments of the disclosure means that the data packet corresponding to the SN is not confirmed. To be specific, the unconfirmed data packet corresponding to the SN means that ACK information of the data packet corresponding to the SN is not received.

Optionally, the initial value of TX_Next_Ack is 0.

3) TX_Next: is used to indicate the SN of the next data packet expected to be sent in the send window (referred to as the SN of the next data packet expected in the send window).

Optionally, the initial value of TX_Next is 0.

In the embodiments of the disclosure, the first sending parameter refers to TX_Next, and the network device sends the corresponding first data packet according to the SN indicated by TX_Next.

Step 502: If the network device confirms that the first data packet has been accurately received by at least one terminal device, the network device moves the send window. A starting SN of the send window before being moved is a first SN, a starting SN of the send window after being moved is a second SN, and the second SN is a first unconfirmed SN after the first SN.

In the embodiments of the disclosure, a send window moving mechanism is provided. That is, if the network device confirms that the first data packet has been accurately received by the at least one terminal device, the network device moves the send window.

In the embodiments of the disclosure, the starting SN of the send window before being moved is the first SN, and the first SN is the first unconfirmed SN in the send window. The starting SN of the send window after being moved is the second SN, and the second SN is the first unconfirmed SN in a second send window. Herein, the second SN is the first unconfirmed SN after the first SN.

In the embodiments of the disclosure, the step of confirming, by the network device, that the first data packet has been accurately received by the at least one terminal device further includes the following steps.

Manner One

After the network device sends the first data packet, the network device sets a first counter to 0 and activates a first timer. The network device controls the first counter to increase by 1 each time the network device receives the ACK information for the first data packet. Before the first timer expires, if a value of the first counter is equal to a first threshold, the first timer is stopped, and it is confirmed that the first data packet is accurately received by the at least one terminal device. The network device moves the send window. If the first timer expires, the network device retransmits the first data packet.

In an optional embodiment, the first threshold is equal to the number of members in a multicast group, or the first threshold is less than the number of members in the multicast group.

In an optional embodiment, at least one of the first counter, the first timer, and the first threshold is configured through the first MCCH.

In specific implementation, the send window maintains a counter for each sent data packet and activates a timer at the same time, and each time the ACK information for the data packet is received, the counter is increased by 1. Before the timer expires, when the counter is equal to the number of members in the multicast group or a predetermined value, the timer is stopped and the send window is moved. To be specific, the starting SN of the send window is moved to the next unconfirmed SN, and if the timer expires, the retransmission of the data packet is triggered.

Manner Two

After sending the first data packet, the network device activates a first timer. Before the first timer expires, if the network device does not receive NACK information for the first data packet, it is confirmed that the first data packet is accurately received by the at least one terminal device. The network device moves the send window. Before the first timer expires, if the network device receives the NACK information for the first data packet, the network device retransmits the first data packet.

In an optional embodiment, the first timer is configured through the first MCCH.

In specific implementation, the send window activates a timer for each sent data packet. Before the timer expires, if the network device does not receive the NACK information for the data packet, it is determined that the data packet is received accurately and the send window is moved. To be specific, the starting SN of the send window is moved to the next unconfirmed SN, and if the network device receives the NACK information for the data packet, the retransmission of the data packet is triggered.

Manner Three

A) When the network device retransmits the first data packet, if the number of times of retransmission of the first data packet reaches a second threshold, it is confirmed that the first data packet is accurately received by the at least one terminal device, and the network device moves the send window. B) Alternatively, when the network device retransmits the first data packet, if a second timer expires, it is confirmed that the first data packet is accurately received by the at least one terminal device, and the network device moves the send window. Herein, the second timer is activated after the network device sends the first data packet for a first time.

In an optional embodiment, at least one of the second threshold and the second timer is configured through the first MCCH.

In specific implementation, for the data packet corresponding to the received NACK information, the network device may trigger the retransmission of the data packet. If the number of times of retransmissions of the data packet reaches the second threshold, or the timer is activated from the first transmission of the data packet, if the timer expires, it is determined that the data packet is accurately received, and the starting SN of the send window is moved to the next unconfirmed SN.

In an optional embodiment of the disclosure, the network device sends the first MCCH, and the first MCCH may be understood with reference to the foregoing related description. Note that the first MCCH carries at least one of the following: first indication information (used to indicate whether the MBMS service requires RLC feedback or PDCP feedback), second indication information (used to indicate the number of members in the multicast group corresponding to the MBMS service), and third indication information (used to indicate whether the terminal device needs to enter the connected state to receive the MBMS service). Further, the network device allocates a member index number to the terminal device registered with the MBMS service.

Note that in an embodiment of the disclosure, the send window is a send window associated with a RLC entity, that is, the moving mechanism of the send window is implemented by the RLC entity, and correspondingly, the data packet refers to an RLC PDU. In another embodiment of the disclosure, the send window is a send window associated with a PDCP entity, that is, the moving mechanism of the send window is implemented by the PDCP entity, and correspondingly, the data packet refers to a PDCP PDU.

FIG. 7 is a second schematic flow chart of a window adjustment method provided by an embodiment of the disclosure. As shown in FIG. 7, the window adjustment method includes the following steps.

Step 701: A terminal device moves a receiving window based on an SN of a received first data packet or first indication information. Herein, the first indication information is used to indicate a third SN, and a data packet corresponding to an SN before the third SN is not repeatedly transmitted.

In the embodiments of the disclosure, the receiving window includes a plurality of SNs.

Further, with reference to FIG. 8A, the receiving window includes the SNs in the following range: RX_Next<=SN<RX_Next+MBMS_Window_Size.

Figure 8A:
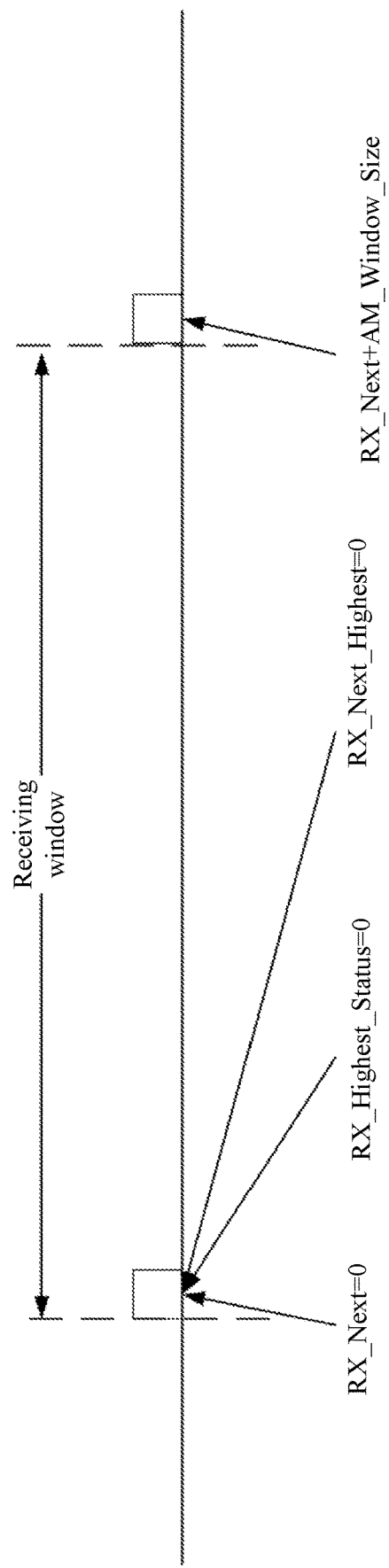
FIG. 8A is a first schematic diagram of a receiving window provided by an embodiment of the disclosure.

The variables in FIG. 8A are described below.

1) MBMS_Window_Size: is used to indicate a window length of the receiving window, and optionally, the window length of the receiving window is configured by the first MCCH or agreed through a protocol.

2) RX_Next: is used to indicate a next SN of an accurately received SN or an inaccurately received SN in the receiving window.

Optionally, the initial value of RX_Next is 0.

It should be noted that the accurately received SN in the embodiments of the disclosure means that the data packet corresponding to the SN is accurately received. To be specific, the data packet corresponding to the SN being accurately received means that the data packet corresponding to the SN is completely received.

Taking the data packet as an RLC SDU as an example, RX_Next is used to indicate the next SN of the SN of the accurately received RLC SDU in the receiving window.

3) RX_Next_Status_Trigger: is used to indicate the next SN of the SN of the data packet that triggers a t-Reassembly timer.

4) RX_Highest_Status: is used to indicate a maximum SN for assembling a first report, and the first report is a control status report or a data packet feedback report.

Herein, the control status report may be an RLC status report or a PDCP status report.

Optionally, the initial value of RX_Highest_Status is 0.

5) RX_Next_Highest: is used to indicate the SN of the next data packet expected to be received in the receiving window.

Optionally, the initial value of RX_Next_Highest is 0.

In the embodiments of the disclosure, a moving mechanism of a receiving window is provided. That is, the terminal device moves the receiving window based on the SN of the received first data packet or the first indication information. Further, the moving mechanism of the receiving window may be implemented in any of the following manners.

Manner One (NR Baseline)

The terminal device confirms a first receiving parameter, and the first receiving parameter is used to indicate the next SN of the accurately received SN or the inaccurately received SN in the receiving window. The terminal device receives the first data packet, and if the SN of the first data packet is equal to the first receiving parameter, the terminal device moves the receiving window. Herein, a starting SN of the receiving window before being moved is a fourth SN, a starting SN of the receiving window after being moved is a fifth SN, and the fifth SN is a first inaccurately received SN after the fourth SN.

Figure 8B:
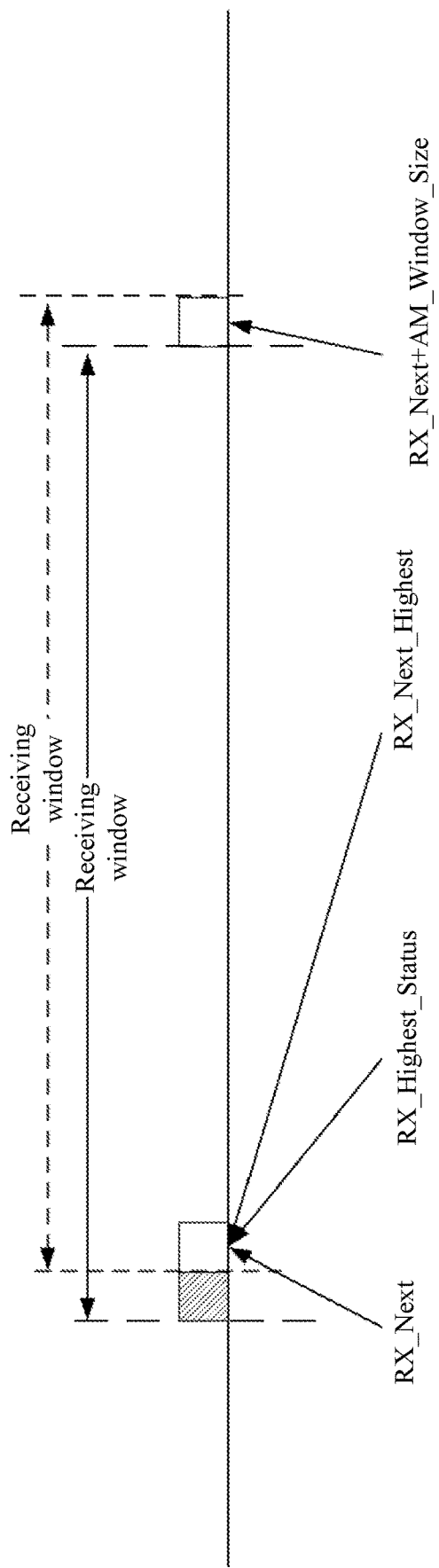
FIG. 8B is a second schematic diagram of a receiving window provided by an embodiment of the disclosure.

In the embodiments of the disclosure, the first receiving parameter refers to RX_Next. In specific implementation, with reference to FIG. 8B, the terminal device receives the first data packet. If the SN of the first data packet is equal to RX_Next, the receiving window is moved (that is, the receiving window is updated). To be specific, moving a starting position of the receiving window to the next inaccurately received SN may also be understood as updating RX_Next to the next inaccurately received SN.

It should be noted that the inaccurately received SN in the embodiments of the disclosure means that the data packet corresponding to the SN is not accurately received or is not completely received.

Manner Two (Best Effort)

The terminal device confirms a first receiving parameter, and the first receiving parameter is used to indicate the next SN of the accurately received SN or the inaccurately received SN in the receiving window. The terminal device receives the first data packet, and activates a third timer if the SN of the first data packet is not equal to the first receiving parameter. Before the third timer expires, if the network device receives a data packet corresponding to the first receiving parameter, the third timer is stopped. If the third timer expires, the terminal device moves the receiving window. Herein, the starting SN of the receiving window before being moved is the fourth SN, the starting SN of the receiving window after being moved is the fifth SN, and the fifth SN is the first inaccurately received SN after the fourth SN.

In an optional embodiment, the third timer is configured through the first MCCH.

In the embodiments of the disclosure, the first receiving parameter refers to RX_Next. In specific implementation, if the SN indicated by RX_Next is not accurately received, the timer is activated, and if the SN indicated by RX_Next is received before the timer expires, the timer is stopped. If the timer expires, moving the starting position of the receiving window to the next inaccurately received SN may also be understood as updating RX_Next to the next inaccurately received SN, and optionally, the timer is re-activated.

Manner Three (Based on Network Control Receiving Window)

The terminal device receives a first control PDU, and the first control PDU carries the first indication information. The terminal device moves the receiving window based on the third SN carried in the first indication information. Herein, the starting SN of the receiving window after being moved is equal to the third SN, or the starting SN of the receiving window after being moved is the first inaccurately received SN after the third SN.

In specific implementation, the network side issues the first control PDU, the first control PDU carries the first indication information, and the first indication information is used to indicate an SN (that is, the third SN). The data packet corresponding to the SN before this SN number is no longer repeatedly transmitted, and the terminal device may move the starting position of the receiving window to the SN or move to the nearest SN that is not accurately received and is greater than or equal to the SN.

In the embodiments of the disclosure, the feedback of the terminal device to the data packet may be fed back at the granularity of the data packet group (that is, per data packet group feedback), or may be fed back at the granularity of the data packet (that is, per data packet feedback), and specific description thereof is provided as follows.

Feedback with Data Packet Group as Granularity (I) If a second receiving parameter is greater than or equal to the first receiving parameter plus 1 or the second receiving parameter is greater than or equal to a third receiving parameter plus 1, the terminal device activates a reassembly timer. If the reassembly timer expires, the terminal device sends a first report, and the first report is a control status report or a data packet feedback report. Herein, the first receiving parameter is used to indicate the next SN of the accurately received SN or the inaccurately received SN in the receiving window, the second receiving parameter is used to indicate the SN of the next data packet expected to be received in the receiving window, and the third receiving parameter is used to indicate the maximum SN for assembling the first report.

In the embodiments of the disclosure, the first receiving parameter refers to RX_Next. The second receiving parameter refers to RX_Next_Highest. The third receiving parameter refers to RX_Highest_Status.

Figure 8C:
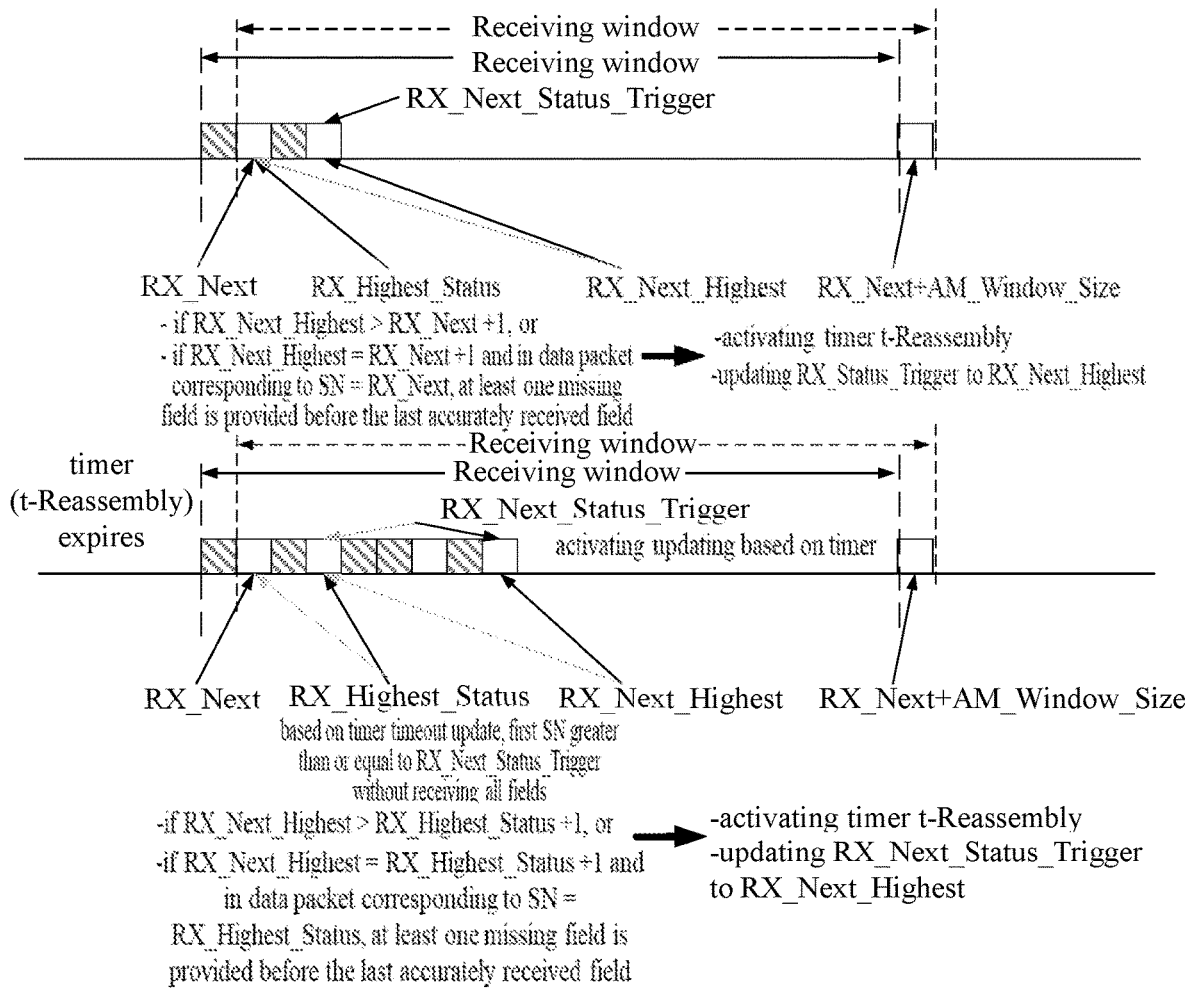
FIG. 8C is a third schematic diagram of a receiving window provided by an embodiment of the disclosure.

In specific implementation, with reference to FIG. 8C, if RX_Next_Highest≥RX_Next+1 or RX_Next_Highest≥RX_Highest_Status+1, the reassembly timer is activated. If the reassembly timer expires, the first report is fed back, and the first report is a control status report or a data packet feedback report. Further, the control status report is an RLC status report or a PDCP status report.

(II) The terminal device receives probe indication information sent by a network device, and the probe indication information is used to trigger the terminal device to send the first report.

In specific implementation, if the terminal device receives the probe indication information sent by the network device, the terminal device sends the first report, and the first report is a control status report or a data packet feedback report. Further, the control status report is an RLC status report or a PDCP status report.

In the embodiments of the disclosure, the terminal device may send the first report by adopting any one of the sending manners provided as follows.

Sending manner one: The terminal device sends the first report through an RLC layer, and the first report includes feedback information of a data packet corresponding to a SN in the following range: first receiving parameter≤SN<third receiving parameter.

Herein, the terminal device sends the first report through the RLC layer when entering the linked state or already being in the connected state, and the first report includes the ACK information or the NACK information of SN data packets in the following range: RX_Next<=SN<RX_Highest_Status.

Sending manner two: The terminal device sends the first report through a MAC layer, and the first report includes feedback information of a data packet corresponding to a SN in the following range: first receiving parameter≤SN<third receiving parameter.

Herein, the terminal device sends the first report through the MAC layer, and the first report includes the ACK information or the NACK information of SN data packets in the following range: RX_Next<=SN<RX_Highest_Status.

Sending manner three: The terminal device sends the first report through a PUCCH, and the first report includes feedback information of a data packet corresponding to a SN in the following range: first receiving parameter≤SN<third receiving parameter.

Herein, the terminal device sends the first report through the PUCCH, and the first report includes the ACK information or the NACK information of SN data packets in the following range: RX_Next<=SN<RX_Highest_Status.

Further, optionally, the first report may further include at least one as follows: a service identifier of the terminal device, a member index number of the terminal device in a multicast group, and the SN of the data packet corresponding to the feedback information.

Note that in the above feedback manner, only the NACK information may be fed back, the ACK information may not be fed back, or both the NACK information and the ACK information may be fed back.

Feedback with Data Packet as Granularity (III) If the first receiving parameter is initialized or updated, the terminal device activates a fourth timer, and the first receiving parameter is used to indicate the next SN of the accurately received SN or the inaccurately received SN in the receiving window. Before the fourth timer expires, if the network device receives the data packet corresponding to the first receiving parameter, the fourth timer is stopped. If the fourth timer expires, the terminal device sends feedback information of the first data packet, and the first data packet is a data packet corresponding to the first receiving parameter.

In an optional embodiment, the fourth timer is configured through the first MCCH.

In the embodiments of the disclosure, the first receiving parameter refers to RX_Next.

In specific implementation, if RX_Next is initialized or updated, one timer is activated. If the data packet of the SN indicated by RX_Next is received before the timer expires, the timer is stopped. If the timer expires, the NACK information or the ACK information of the data packet of the SN indicated by RX_Next is fed back, or only the NACK information is fed back but the ACK information is not fed back.

In the embodiments of the disclosure, the terminal device may send the feedback information of the first data packet by adopting any one of the sending manners provided as follows.

Sending manner one: Through the PUCCH, the terminal device sends the feedback information of the first data packet and at least one as follows: the service identifier of the terminal device, the member index number of the terminal device in the multicast group, and the SN of the first data packet corresponding to the feedback information.

Sending manner two: Through the PUCCH, the terminal device sends the feedback information of the first data packet, and a resource of the PUCCH is determined according to at least one as follows: the service identifier of the terminal device, the member index number of the terminal device in the multicast group, and the SN of the first data packet corresponding to the feedback information.

Note that in an embodiment of the disclosure, the receiving window is a receiving window associated with a RLC entity, that is, the moving mechanism of the receiving window is implemented by the RLC entity, and correspondingly, the data packet refers to an RLC SDU. In another embodiment of the disclosure, the receiving window is a receiving window associated with a PDCP entity, that is, the moving mechanism of the receiving window is implemented by the PDCP entity, and correspondingly, the data packet refers to a PDCP SDU.

Figure 9:
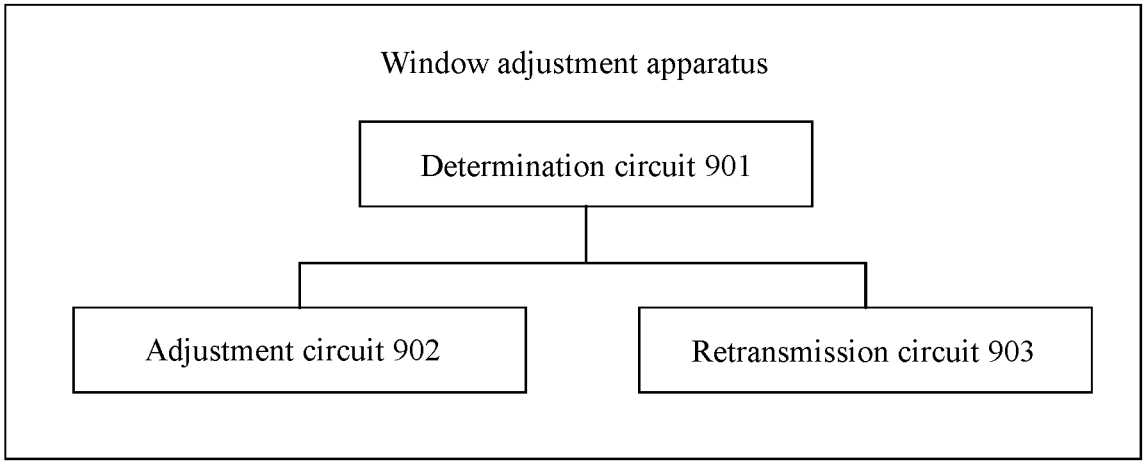
FIG. 9 is a first schematic diagram of a structure forming a window adjustment apparatus provided by an embodiment of the disclosure.

FIG. 9 is a first schematic diagram of a structure forming a window adjustment apparatus provided by an embodiment of the disclosure. As shown in FIG. 9, the window adjustment apparatus includes a determination circuit 901 and an adjustment circuit 902.

The determination circuit 901 is used for determining a first sending parameter used to indicate an SN of a first data packet and sending the first data packet according to the first sending parameter. The first data packet is a next data packet expected to be sent in a send window.

The adjustment circuit 902 is used for moving the send window if the adjustment circuit 902 confirms that the first data packet is accurately received by at least one terminal device. Herein, a starting SN of the send window before being moved is a first SN, a starting SN of the send window after being moved is a second SN, and the second SN is a first unconfirmed SN after the first SN.

In an optional embodiment, the first SN is a first unconfirmed SN in the send window.

In an optional embodiment, the second SN is a first unconfirmed SN in the second send window.

In an optional embodiment, a window length of the send window is configured through a first MCCH or agreed through a protocol.

In an optional embodiment, the determination circuit 901 is used for setting a first counter to 0 and activating a first timer after sending the first data packet. The determination circuit 901 controls the first counter to increase by 1 each time the determination circuit 901 receives ACK information for the first data packet. Before the first timer expires, if a value of the first counter is equal to a first threshold, the determination circuit 901 stops the first timer and confirms that the first data packet is accurately received by the at least one terminal device.

In an optional embodiment, the apparatus further includes a retransmission circuit 903.

The retransmission circuit 903 is used for retransmitting the first data packet if the first timer expires.

In an optional embodiment, the first threshold is equal to the number of members in a multicast group, or the first threshold is less than the number of members in the multicast group.

In an optional embodiment, at least one of the first counter, the first timer, and the first threshold is configured through the first MCCH.

In an optional embodiment, the determination circuit 901 is used for activating the first timer after sending the first data packet and confirming that the first data packet is accurately received by the at least one terminal device if not receiving NACK information for the first data packet before the first timer expires.

In an optional embodiment, the apparatus further includes a retransmission circuit 903.

The retransmission circuit 903 is used for retransmitting, by the network device, the first data packet if receiving the NACK information for the first data packet before the first timer expires.

In an optional embodiment, the determination circuit 901 is used for confirming that the first data packet is accurately received by the at least one terminal device if the number of times of retransmission of the first data packet reaches a second threshold when being used for retransmitting the first data packet. Alternatively, the determination circuit 901 confirms that the first data packet is accurately received by the at least one terminal device if a second timer expires when being used for retransmitting the first data packet. The second timer is activated after the network device sends the first data packet for a first time.

In an optional embodiment, at least one of the second threshold and the second timer is configured through the first MCCH.

In an optional embodiment, the apparatus further includes a sending circuit.

The sending circuit (not shown) is used for sending the first MCCH, and the first MCCH carries at least one as follows:

first indication information, used to indicate whether a MBMS service requires RLC feedback or PDCP feedback;

second indication information, used to indicate the number of members in the multicast group corresponding to the MBMS service; and third indication information, used to indicate whether the terminal device needs to enter a connected state to receive the MBMS service.

In an optional embodiment, the send window is a send window associated with an RLC entity.

In an optional embodiment, the send window is a send window associated with a PDCP entity.

A person having ordinary skill in the art should understand that the relevant description of the foregoing window adjustment apparatus in the embodiments of the disclosure may be understood with reference to the relevant description of the window adjustment method in the embodiments of the disclosure.

Figure 10:
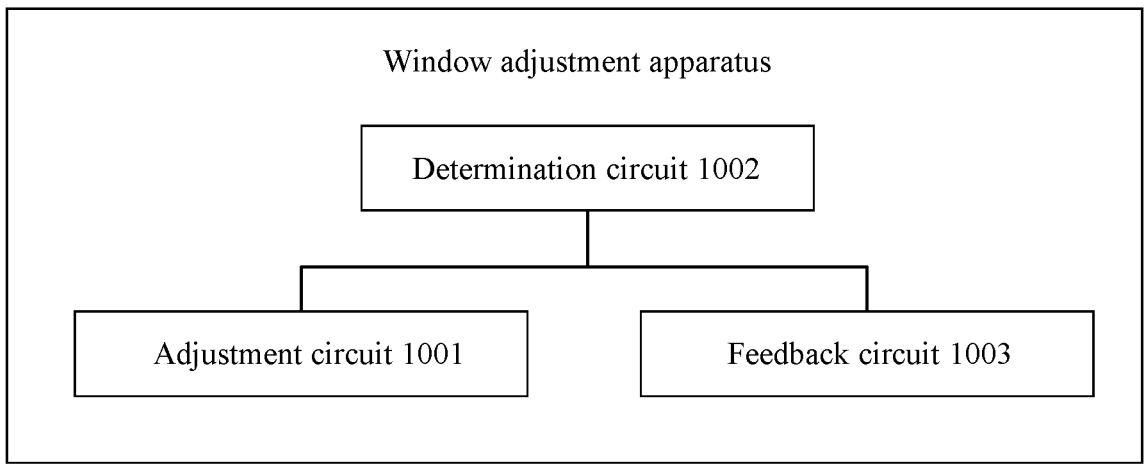
FIG. 10 is a second schematic diagram of a structure forming a window adjustment apparatus provided by an embodiment of the disclosure.

FIG. 10 is a second schematic diagram of a structure forming a window adjustment apparatus provided by an embodiment of the disclosure. As shown in FIG. 10, the window adjustment apparatus includes an adjustment circuit 1001.

The adjustment circuit 1001 is used for moving a receiving window based on an SN of a received first data packet or first indication information. The first indication information is used to indicate a third SN, and a data packet corresponding to an SN before the third SN is not repeatedly transmitted.

In an optional embodiment, a window length of the receiving window is configured through a first MCCH or agreed through a protocol.

In an optional embodiment, the apparatus further includes a determination circuit 1002.

The determination circuit 1002 is used for confirming a first receiving parameter, and the first receiving parameter is used to indicate a next SN of an accurately received SN or an inaccurately received SN in the receiving window.

The adjustment circuit 1001 is used for receiving the first data packet and moving the receiving window if the SN of the first data packet is equal to the first receiving parameter.

A starting SN of the receiving window before being moved is a fourth SN, a starting SN of the receiving window after being moved is a fifth SN, and the fifth SN is a first inaccurately received SN after the fourth SN.

In an optional embodiment, the apparatus further includes a determination circuit 1002 and an adjustment circuit 1001.

The determination circuit 1002 is used for confirming a first receiving parameter, and the first receiving parameter is used to indicate a next SN of an accurately received SN or an inaccurately received SN in the receiving window.

The adjustment circuit 1001 is used for receiving the first data packet and activating a third timer if the SN of the first data packet is not equal to the first receiving parameter. Before the third timer expires, if the network device receives a data packet corresponding to the first receiving parameter, the third timer is stopped. If the third timer expires, the terminal device moves the receiving window.

A starting SN of the receiving window before being moved is a fourth SN, a starting SN of the receiving window after being moved is a fifth SN, and the fifth SN is a first inaccurately received SN after the fourth SN.

In an optional embodiment, the third timer is configured through the first MCCH.

In an optional embodiment, the apparatus further includes a receiving circuit and the adjustment circuit 1001.

The receiving circuit (not shown) is used for receiving a first control PDU, and the first control PDU carries the first indication information.

The adjustment circuit 1001 is used for moving the receiving window based on the third SN carried in the first indication information.

Herein, the starting SN of the receiving window after being moved is equal to the third SN, or the starting SN of the receiving window after being moved is the first inaccurately received SN after the third SN.

In an optional embodiment, the apparatus further includes a feedback circuit 1003.

The feedback circuit 1003 is used for activating a reassembly timer if a second receiving parameter is greater than or equal to the first receiving parameter plus 1 or the second receiving parameter is greater than or equal to a third receiving parameter plus 1. If the reassembly timer expires, a first report is sent, and the first report is a control status report or a data packet feedback report.

The first receiving parameter is used to indicate a next SN of an accurately received SN or an inaccurately received SN in the receiving window, the second receiving parameter is used to indicate an SN of a next data packet expected to be received in the receiving window, and the third receiving parameter is used to indicate a maximum SN for assembling the first report.

In an optional embodiment, the apparatus further includes a feedback circuit 1003.

The feedback circuit 1003 is used for sending a control status report after receiving probe indication information sent by a network device, and the probe indication information is used to trigger the terminal device to send the first report.

In an optional embodiment, the feedback circuit 1003 is used for sending the first report through an RLC layer, a MAC layer, or a PUCCH, and the first report includes feedback information of a data packet corresponding to a SN in the following range: first receiving parameter≤SN<third receiving parameter.

In an optional embodiment, the first report may further include at least one as follows: a service identifier of the terminal device, a member index number of the terminal device in a multicast group, and the SN of the data packet corresponding to the feedback information.

In an optional embodiment, the apparatus further includes a feedback circuit 1003.

The feedback circuit 1003 is used for activating a fourth timer if the first receiving parameter is initialized or updated, and the first receiving parameter is used to indicate the next SN of the accurately received SN or the inaccurately received SN in the receiving window. Before the fourth timer expires, if the data packet corresponding to the first receiving parameter is received, the fourth timer is stopped. If the fourth timer expires, feedback information of the first data packet is sent, and the first data packet is a data packet corresponding to the first receiving parameter.

In an optional embodiment, the feedback circuit 1003 is used for sending, through a PUCCH, the feedback information of the first data packet and at least one as follows: a service identifier of the terminal device, a member index number of the terminal device in a multicast group, and the SN of the first data packet corresponding to the feedback information.

In an optional embodiment, the feedback circuit 1003 is used for sending, through a PUCCH, the feedback information of the first data packet, and a resource of the PUCCH is determined according to at least one as follows: a service identifier of the terminal device, a member index number of the terminal device in a multicast group, and the SN of the first data packet corresponding to the feedback information.

In an optional embodiment, the fourth timer is configured through the first MCCH.

A person having ordinary skill in the art should understand that the relevant description of the foregoing window adjustment apparatus in the embodiments of the disclosure may be understood with reference to the relevant description of the window adjustment method in the embodiments of the disclosure.

Figure 11:
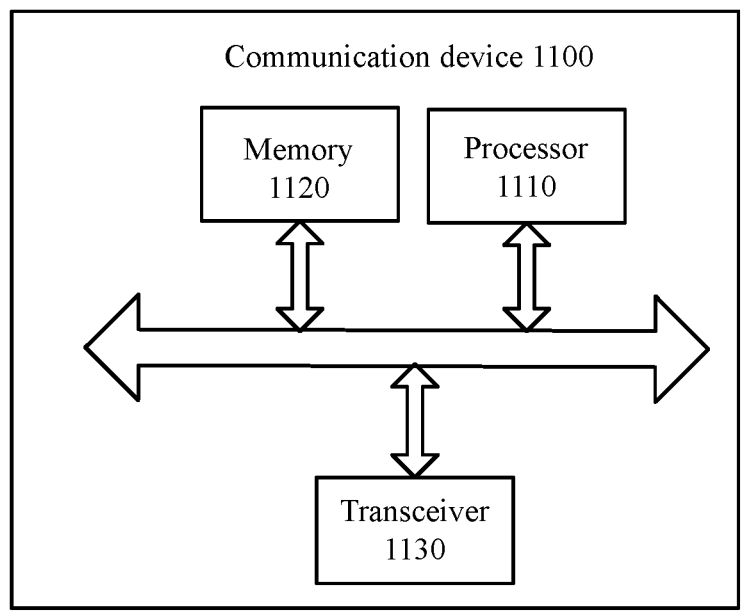
FIG. 11 is a schematic view of a structure of a communication device provided by an embodiment of the disclosure.

FIG. 11 is a schematic view of a structure of a communication device 1100 provided by an embodiment of the disclosure. The communication device may be a terminal device or a network device. The communication device 1100 shown in FIG. 11 includes a processor 1110, and the processor 1110 may call and run a computer program from a memory to implement the method in the embodiments of the disclosure.

Optionally, as shown in FIG. 11, the communication device 1100 may further include a memory 1120. Herein, the processor 1110 may call and run a computer program from the memory 1120 to implement the method in the embodiments of the disclosure.

The memory 1120 may be a separate device independent of the processor 1110 or may be integrated in the processor 1110.

Optionally, as shown in FIG. 8, the communication device 1100 may further include a transceiver 1130, and the processor 1110 may control the transceiver 1130 to communicate with other devices. Specifically, it can send information or data to other devices or receive information or data sent by other devices.

The transceiver 1130 may include a transmitter and a receiver. The transceiver 1130 may further include an antenna, and a number of antennas may be one or more.

Optionally, the communication device 1100 may specifically be the network device in the embodiments of the disclosure, and the communication device 1100 may implement the corresponding processes implemented by the network device in the various methods in the embodiments of the disclosure. For the sake of brevity, description thereof is not repeated herein.

Optionally, the communication device 1100 may specifically be a mobile terminal/the terminal device in the embodiments of the disclosure, and the communication device 1100 may implement the corresponding process flows implemented by the mobile terminal/terminal device in the various methods in the embodiments of the disclosure. For the sake of brevity, description thereof is not repeated herein.

Figure 12:
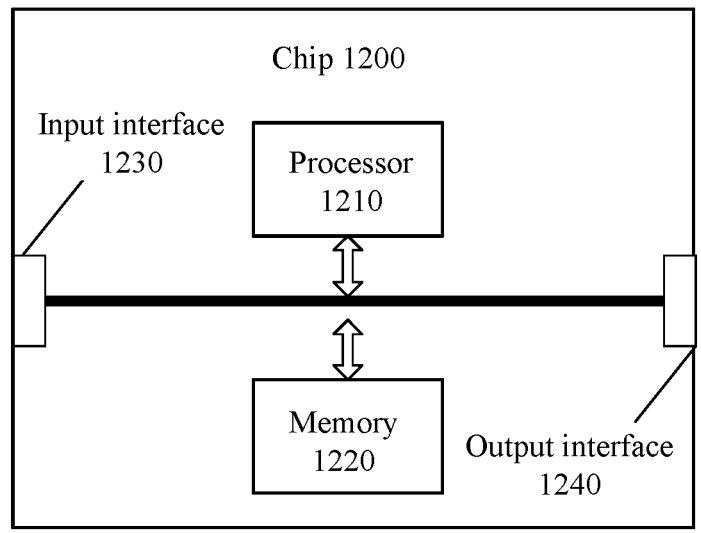
FIG. 12 is a schematic view of a structure of a chip provided by an embodiment of the disclosure.

FIG. 12 is a schematic view of a structure of a chip according to an embodiment of the disclosure. A chip 1200 shown in FIG. 12 includes a processor 1210, and the processor 1210 may call and run a computer program from a memory to implement the method in the embodiments of the disclosure.

Optionally, as shown in FIG. 12, the chip 1200 may further include a memory 1220. Herein, the processor 1210 may call and run a computer program from the memory 1220 to implement the method in the embodiments of the disclosure.

The memory 1220 may be a separate device independent of the processor 1210 or may be integrated in the processor 1210.

Optionally, the chip 1200 may further include an input interface 1230. Herein, the processor 1210 may control the input interface 1230 to communicate with other devices or chips, and specifically, may obtain information or data sent by other devices or chips.

Optionally, the chip 1200 may further include an output interface 1240. Herein, the processor 1210 may control the output interface 1240 to communicate with other devices or chips, and specifically, may output information or data to other devices or chips.

Optionally, the chip may be applied to the network device in the embodiments of the disclosure, and the chip may implement the corresponding process flows implemented by the network device in the various methods in the embodiments of the disclosure. For the sake of brevity, description thereof is not repeated herein.

Optionally, the chip may be applied to the mobile terminal/terminal device in the embodiments of the disclosure, and the chip may implement the corresponding process flows implemented by the mobile terminal/terminal device in the various methods in the embodiments of the disclosure. For the sake of brevity, description thereof is not repeated herein.

It should be understood that the chip mentioned in the embodiments of the disclosure may also be referred to as a system-level chip or a system on a chip.

Figure 13:
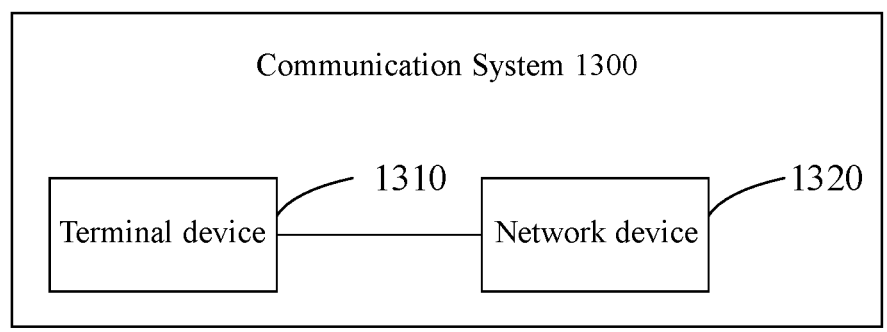
FIG. 13 is a schematic block diagram of a communication system provided by an embodiment of the disclosure.

FIG. 13 is a schematic block view of a communication system 1300 provided by an embodiment of the disclosure. As shown in FIG. 13, the communication system 1300 includes a terminal device 1310 and a network device 1320.

Herein, the terminal device 1310 may be used to implement the corresponding functions implemented by the terminal device in the foregoing method, and the network device 1320 may be used to implement the corresponding functions implemented by the network device in the foregoing method. For the sake of brevity, description thereof is not repeated herein.

It should be understood that the processor of the embodiments of the disclosure may be an integrated circuit chip with signal processing capability. In the implementation process, the steps of the foregoing method in the embodiments may be completed by an integrated logic circuit of hardware or an instruction in the form of software in the processor. The processor may be a general-purpose processor, a digital signal processor (DSP), an application specific integrated circuit (ASIC), a field programmable gate array (FPGA), or other components such as a programmable logic device, a discrete gate, a transistor logic device, and a discrete hardware component. The processor may implement or execute various methods, steps, and logical block views disclosed in the embodiments of the disclosure. The general-purpose processor may be a microprocessor, or the processor may be any conventional processor and the like. The steps of the method disclosed in the embodiments of the disclosure may be directly implemented as being executed and completed by a hardware decoding processor, or may be executed and completed by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads the information in the memory and completes the steps of the foregoing method in combination with its hardware.

It may be understood that the memory in the embodiments of the disclosure may be a volatile memory or a non-volatile memory or may include both the volatile memory and the non-volatile memory. The non-volatile memory may be a ready-only memory (ROM), a programmable ROM (PROM), an erasable PROM (EPROM), an electrically EPROM (EEPROM), or a flash memory. The volatile memory may be a random access memory (RAM) used as an external cache. By way of exemplary but not restrictive description, many forms of the RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DRRAM). It should be noted that the memory of the system and the method described herein is intended to include, but not limited to, these and any other suitable types of memories.

It should be understood that the above-mentioned memory is exemplary but not restrictive. For instance, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a direct rambus RAM (DR RAM) and the like. That is, the memory in the embodiments of the disclosure is intended to include, but not limited to, these and any other suitable types of memory.

The embodiments of the disclosure further provide a computer-readable storage medium configured for storing a computer program.

Optionally, the computer-readable storage medium may be applied to the network device in the embodiments of the disclosure, and the computer program causes a computer to execute the corresponding processes implemented by the network device in the various methods of the embodiments of the disclosure. For the sake of brevity, description thereof is not repeated herein.

Optionally, the computer-readable storage medium may be applied to the mobile terminal/terminal device in the embodiments of the disclosure, and the computer program causes a computer to execute the corresponding processes implemented by the mobile terminal/terminal device in the various methods of the embodiments of the disclosure. For the sake of brevity, description thereof is not repeated herein.

The embodiments of the disclosure further provide a computer program product including a computer program instruction.

Optionally, the computer program product may be applied to the network device in the embodiments of the disclosure, and the computer program instruction causes the computer to execute the corresponding processes implemented by the network device in the various methods of the embodiments of the disclosure. For the sake of brevity, description thereof is not repeated herein.

Optionally, the computer program product may be applied to the mobile terminal/terminal device in the embodiments of the disclosure, and the computer program instruction causes a computer to execute the corresponding processes implemented by the mobile terminal/terminal device in the various methods of the embodiments of the disclosure. For the sake of brevity, description thereof is not repeated herein.

The embodiments of the disclosure further provide a computer program.

Optionally, the computer program may be applied to the network device in the embodiments of the disclosure, and when running on a computer, the computer program causes the computer to execute the corresponding processes implemented by the network device in the various methods of the embodiments of the disclosure. For the sake of brevity, description thereof is not repeated herein.

Optionally, the computer program may be applied to the mobile terminal/terminal device in the embodiments of the disclosure, and when running on a computer, the computer program causes the computer to execute the corresponding processes implemented by the mobile terminal/terminal device in the various methods of the embodiments of the disclosure. For the sake of brevity, description thereof is not repeated herein.

A person having ordinary skill in the art may be aware that in combination with the disclosed embodiments, the described exemplary units and algorithm steps may be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered beyond the scope of the disclosure.

A person having ordinary skill in the art may clearly understand that, for the convenience and brevity of description, the specific working process of the abovementioned system, device, and unit may refer to the corresponding processes in the foregoing method embodiments, which are not repeated herein.

In the several embodiments provided in the disclosure, it should be understood that the disclosed system, device, and method may be implemented in other ways. For instance, the device embodiments described above are only illustrative. For instance, the division of the units is only a logical function division, and there may be other division methods in actual implementation. For instance, multiple units or components may be combined or integrated into another system, or some features may be omitted or may not be implemented. In addition, the displayed or discussed mutual coupling or direct coupling or communication connection may be implemented through some interfaces, and the indirect coupling or communication connection of the device or units may be in electrical, mechanical, or other forms.

The units described as separate components may or may not be physically separated, and the components displayed as units may or may not be physical units, that is, they may be located in one place, or they may be distributed on multiple network units. Some of or all of the units may be selected according to actual needs to achieve the objectives of the solutions of the embodiments.

In addition, in the embodiments of the disclosure, each functional unit may be integrated into one processing unit, or each unit may exist alone physically, or two or more units may be integrated into one unit.

If the function is implemented in the form of a software functional unit and sold or used as an independent product, it may be stored in a computer-readable storage medium. Based on this understanding, regarding the technical solution of the disclosure, the part that contributes to the related art or the part of the technical solution may be embodied in the form of a software product in essence. The computer software product is stored in a storage medium and includes a number of instructions to enable a computer device (which may be a personal computer, a server, or the network device and the like) to execute all or part of the steps of the method described in the various embodiments of the disclosure. The aforementioned storage medium includes a U disk, a mobile hard disk, a read-only memory (ROM), a random access memory (RAM), a magnetic disk, an optical disk, or other media that may store program codes.

The above are only specific implementations of the disclosure, but the protection scope of the disclosure is not limited thereto. A person having ordinary skill in the art may easily think of changes or substitutions within the technical scope disclosed in the disclosure, and these changes or substitutions should be covered by the protection scope of the disclosure. Therefore, the protection scope of the disclosure shall be subject to the protection scope of the claims.

What is claimed is:

1. A window adjustment method, comprising:
    determining, by a network device, a first sending parameter used to indicate secondary node (SN) of a first data packet and sending the first data packet according to the first sending parameter, wherein the first data packet is a next data packet expected to be sent in a send window; and
    moving, by the network device, the send window if confirming, by the network device, that the first data packet is accurately received by at least one terminal device,
    wherein a starting SN of the send window before being moved is a first SN, the starting SN of the send window after being moved is a second SN, and the second SN is a first unconfirmed SN after the first SN.

2. The method according to claim 1, wherein the step of confirming, by the network device, that the first data packet is accurately received by the at least one terminal device further comprises the following steps:
setting, by the network device, a first counter to 0 and activating, by the network device, a first timer after the network device sends the first data packet;
controlling, by the network device, the first counter to increase by 1 each time the network device receives acknowledgement (ACK) information for the first data packet; and
stopping the first timer and confirming that the first data packet is accurately received by the at least one terminal device if a value of the first counter is equal to a first threshold before the first timer expires;
wherein the method further comprises:
retransmitting, by the network device, the first data packet if the first timer expires;
the first threshold is equal to the number of members in a multicast group, or the first threshold is less than the number of members in the multicast group;
wherein at least one of the first counter, the first timer, and the first threshold is configured through the first MCCH.

3. The method according to claim 1, wherein the step of confirming, by the network device, that the first data packet is accurately received by the at least one terminal device further comprises the following steps:
activating, by the network device, a first timer after sending the first data packet; and
confirming that the first data packet is accurately received by the at least one terminal device if the network device does not receive Negative-Acknowledgment (NACK) information for the first data packet before the first timer expires.

4. The method according to claim 3, further comprising:
retransmitting, by the network device, the first data packet if the network device receives the NACK information for the first data packet before the first timer expires.

5. The method according to claim 1, wherein the step of confirming, by the network device, that the first data packet is accurately received by the at least one terminal device further comprises the following steps:
confirming that the first data packet is accurately received by the at least one terminal device if the number of times of retransmission of the first data packet reaches a second threshold when the network device retransmits the first data packet; or
confirming that the first data packet is accurately received by the at least one terminal device if a second timer expires when the network device retransmits the first data packet, wherein the second timer is activated after the network device sends the first data packet for a first time.

6. The method according to claim 1, further comprising:
sending, by the network device, the first MCCH, wherein the first MCCH carries at least one as follows:
first indication information, used to indicate whether a Multimedia Broadcast Multicast Service (MBMS) service requires Radio Link Control (RLC) feedback or Packet Data Convergence Protocol (PDCP) feedback;
second indication information, used to indicate the number of members in the multicast group corresponding to the MBMS service; and third indication information, used to indicate whether the terminal device needs to enter a connected state to receive the MBMS service.

7. The method according to claim 1, wherein the send window is a send window associated with an RLC entity.

8. The method according to claim 1, wherein the send window is a send window associated with a PDCP entity.

9. A window adjustment method, comprising:
moving, by a terminal device, a receiving window based on secondary node (SN) of a received first data packet or first indication information, wherein the first indication information is used to indicate a third SN, and a data packet corresponding to an SN before the third SN is not repeatedly transmitted.

10. The method according to claim 9, wherein the step of moving, by the terminal device, the receiving window based on the SN of the received first data packet further comprises the following steps:
confirming, by the terminal device, a first receiving parameter, wherein the first receiving parameter is used to indicate a next SN of an accurately received SN or an inaccurately received SN in the receiving window;
receiving, by the terminal device, the first data packet, and moving, by the terminal device, the receiving window if the SN of the first data packet is equal to the first receiving parameter,
wherein a starting SN of the receiving window before being moved is a fourth SN, the starting SN of the receiving window after being moved is a fifth SN, and the fifth SN is a first inaccurately received SN after the fourth SN.

11. The method according to claim 9, wherein the step of moving, by the terminal device, the receiving window based on the SN of the received first data packet further comprises the following steps:
confirming, by the terminal device, a first receiving parameter, wherein the first receiving parameter is used to indicate a next SN of an accurately received SN or an inaccurately received SN in the receiving window;
receiving, by the terminal device, the first data packet, and activating, by the terminal device, a third timer if the SN of the first data packet is not equal to the first receiving parameter;
stopping the third timer if the network device receives a data packet corresponding to the first receiving parameter before the third timer expires; and
moving, by the terminal device, the receiving window if the third timer expires,
wherein a starting SN of the receiving window before being moved is a fourth SN, the starting SN of the receiving window after being moved is a fifth SN, and the fifth SN is a first inaccurately received SN after the fourth SN.

12. The method according to claim 9, wherein the step of moving, by the terminal device, the receiving window based on the received first indication information further comprises the following steps:
receiving, by the terminal device, a first control Packet Data Unit (PDU), wherein the first control PDU carries the first indication information; and
moving, by the terminal device, the receiving window based on the third SN carried in the first indication information,
wherein a starting SN of the receiving window after being moved is equal to the third SN, or the starting SN of the receiving window after being moved is a first inaccurately received SN after the third SN.

13. The method according to claim 9, further comprising:
activating, by the terminal device, a reassembly timer if a second receiving parameter is greater than or equal to the first receiving parameter plus 1 or the second receiving parameter is greater than or equal to a third receiving parameter plus 1; and sending, by the terminal device, a first report if the reassembly timer expires, wherein the first report is a control status report or a data packet feedback report,
wherein the first receiving parameter is used to indicate a next SN of an accurately received SN or an inaccurately received SN in the receiving window, the second receiving parameter is used to indicate an SN of a next data packet expected to be received in the receiving window, and the third receiving parameter is used to indicate a maximum SN for assembling the first report.

14. The method according to claim 9, further comprising:
receiving, by the terminal device, probe indication information sent by a network device, wherein the probe indication information is used to trigger the terminal device to send a first report.

15. The method according to claim 13, wherein the step of sending, by the terminal device, the first report further comprises the following steps:
sending, by the terminal device, the first report through an Radio Link Control (RLC) layer, a Media Access Control (MAC) layer, or a Physical Uplink Control Channel (PUCCH), wherein the first report comprises feedback information of a data packet corresponding to a SN in a following range: first receiving parameter≤SN<third receiving parameter.

16. The method according to claim 15, wherein the first report further comprises at least one as follows: a service identifier of the terminal device, a member index number of the terminal device in a multicast group, and the SN of the data packet corresponding to the feedback information.

17. The method according to claim 9, further comprising:
activating, by the terminal device, a fourth timer, if the first receiving parameter is initialized or updated, wherein the first receiving parameter is used to indicate the next SN of the accurately received SN or the inaccurately received SN in the receiving window;
stopping the fourth timer if the network device receives the data packet corresponding to the first receiving parameter before the fourth timer expires; and
sending, by the terminal device, feedback information of the first data packet if the fourth timer expires, wherein the first data packet is a data packet corresponding to the first receiving parameter.

18. The method according to claim 17, wherein the step of sending, by the terminal device, the feedback information of the first data packet further comprises the following step:
sending, by the terminal device through a PUCCH, the feedback information of the first data packet and at least one as follows: a service identifier of the terminal device, a member index number of the terminal device in a multicast group, and the SN of the first data packet corresponding to the feedback information.

19. The method according to claim 17, wherein the step of sending, by the terminal device, the feedback information of the first data packet further comprises the following step:
sending, by the terminal device through a PUCCH, the feedback information of the first data packet, wherein a resource of the PUCCH is determined according to at least one as follows:
a service identifier of the terminal device, a member index number of the terminal device in a multicast group, and the SN of the first data packet corresponding to the feedback information.

20. A window adjustment apparatus, comprising:
a determination circuit, used for determining a first sending parameter used to indicate an SN of a first data packet and sending the first data packet according to the first sending parameter, wherein the first data packet is a next data packet expected to be sent in a send window; and
an adjustment circuit, used for moving the send window if the adjustment circuit confirms that the first data packet is accurately received by at least one terminal device, wherein a starting SN of the send window before being moved is a first SN, a starting SN of the send window after being moved is a second SN, and the second SN is a first unconfirmed SN after the first SN.

* * * * *